United States Patent
Garcia Manchado

(10) Patent No.: US 9,159,177 B2
(45) Date of Patent: Oct. 13, 2015

(54) DEVICE FOR MONITORING THE PROCESS OF DRIVING A VEHICLE

(75) Inventor: Nilo Garcia Manchado, Torrejon de Ardoz (ES)

(73) Assignees: CRAMBO, S.A., Torrejon de Ardoz (Madrid) (ES); Nilo Garcia Manchado, Torrejon de Ardoz (Madrid) (ES)

(*) Notice: Subject to any disclaimer, the term of this patent is extended or adjusted under 35 U.S.C. 154(b) by 137 days.

(21) Appl. No.: 12/936,172

(22) PCT Filed: Mar. 31, 2009

(86) PCT No.: PCT/ES2009/070084
§ 371 (c)(1),
(2), (4) Date: Feb. 15, 2011

(87) PCT Pub. No.: WO2009/121995
PCT Pub. Date: Oct. 8, 2009

(65) Prior Publication Data
US 2011/0137508 A1 Jun. 9, 2011

(30) Foreign Application Priority Data

Apr. 1, 2008 (ES) .................................. 200800896
Jul. 22, 2008 (ES) .................................. 200802172
Dec. 2, 2008 (ES) .................................. 200803429

(51) Int. Cl.
*G06F 19/00* (2011.01)
*G07C 5/00* (2006.01)
(Continued)

(52) U.S. Cl.
CPC ............ *G07C 5/085* (2013.01); *B60R 16/0236* (2013.01); *G07C 5/004* (2013.01); *G07C 5/0825* (2013.01); *G08G 1/0962* (2013.01)

(58) Field of Classification Search
CPC .. B60R 16/0236; G07C 5/004; G07C 5/0825; G07C 5/085; G07C 5/0808; G08G 1/0962; G08G 1/096833
USPC .......... 701/29–30, 32, 123, 301; 73/112–120; 340/325.06, 436, 439, 461, 462, 340/870.16; 123/478, 480; 447/42–43, 100, 447/107
See application file for complete search history.

(56) References Cited

U.S. PATENT DOCUMENTS 6,092,021 A * 7/2000 Ehlbeck et al. ................ 701/123
2002/0062189 A1* 5/2002 Kannonji ........................ 701/96
(Continued)

FOREIGN PATENT DOCUMENTS

EP  0 076 764 B1  7/1987
EP  1 900 588 A1  3/2008
(Continued)

*Primary Examiner* — Helal A Algahaim
*Assistant Examiner* — Charles J Han
(74) *Attorney, Agent, or Firm* — Arent Fox LLP

(57) ABSTRACT

Device for monitoring the process of driving a vehicle consisting of at least the following:
a first means of processing a signal; a second means of detecting the vehicle movement; a means for providing an HMI type of interactive display of information for the user; and a means configured for knowing the consumption characteristics of the vehicle and its technical characteristics as far as optimum theoretical behaviour;
where the means for processing are configured for calculating the optimum consumption according to the characteristics of the vehicle, establishing the driving parameters required for equating the actual consumption to the optimum consumption, displaying this information to the user in the means available for display.

13 Claims, 3 Drawing Sheets

(51) Int. Cl.
 *G07C 5/08* (2006.01)
 *B60R 16/023* (2006.01)
 *G08G 1/0962* (2006.01)

(56) References Cited

U.S. PATENT DOCUMENTS

2008/0133120 A1* 6/2008 Romanick .................... 701/123

2010/0280729 A1* 11/2010 Samsioe et al. ................. 701/93

FOREIGN PATENT DOCUMENTS

| EP | 1900588 A1 | * | 3/2008 |
| JP | 2003-267173 A | | 9/2003 |
| JP | 2003267173 A | * | 9/2003 |
| JP | 2007-284049 A | | 11/2007 |
| WO | WO 2008128416 A1 | * | 10/2008 |

* cited by examiner

DEVICE FOR MONITORING THE PROCESS OF DRIVING A VEHICLE

CROSS-REFERENCE TO RELATED APPLICATION

This application is a National Stage entry of International Application No. PCT/ES2009/070084 filed Mar. 31, 2009, which claims priority to Spanish Patent Application Nos. P 200800896 filed Apr. 1, 2008, P 200802172 filed Jul. 22, 2008, P 200803123 filed Nov. 8, 2008 and P 200803429 filed Dec. 2, 2008. The disclosures of the prior applications are hereby incorporated in their entirety by reference.

The purpose of this invention is a device for monitoring the process of driving a vehicle, interactive with the user, which can be installed in a standard vehicle for the purpose of achieving an operation of the vehicle with optimum use of fuel from an ecological and economical point of view, which would enable to obtain a reduction in fuel consumption of between 15% and 60%, which would clearly contribute to reducing CO2 emissions. To accomplish this, this invention offers a series of recommendations in real time, based on the optimum calculation of fuel consumption, in a way that offers the user useful advice for achieving a reduction in said fuel consumption and/or optimizing the power-consumption ratio.

This invention fits within the technical sector of driving aid devices.

BACKGROUND OF THE INVENTION

Driving aid devices exist, which enable to monitor the driving in such a way that the driver himself can see how much fuel he is consuming and if the consumption is greater or lower than the expected. However, interactive systems do not exist to help the driver operate in a more ecological and economical manner; and secondly, solve the following technical problems derived from the monitoring of the driving.

(a) Figure out the degree of driving risk as compared to a set of safe driving standards for each type of road that would enable the driver to anticipate that a manoeuvre is dangerous and therefore, the possibility of engaging in serious risk if this manoeuvre is carried out; for example, passing in an unauthorized zone, excessive speed or other cases of interest.

(b) Control the expenditures derived from fuel consumption and others; in a way that such expenditures can be efficiently controlled.

(c) Control the anticipation distance with other vehicles, which is defined as the distance a vehicle must maintain with respect to other vehicles in order to take as much advantage as possible of a vehicle's inertia, as well as thanks to global positioning systems such as GPS, Galileo®, Glonass® or similar and their combination of maps, inform the user, without a connection to the vehicle, of engaging in excessive acceleration for an ecological operation of the vehicle and this way be able to minimize the fuel consumption.

European patent with publication number EP1811411 describes a method and a system for monitoring the driving style. In particular, it describes how to train the driver and analyze the driving in such a way as to improve the safety and economic efficiency when operating a vehicle. To accomplish this, a driving profile is generated in the database based on the data acquired from the vehicle (it is not a device that has the optimum conditions of the car stored in its database; instead, it requires reading the data provided from the engine control unit) and the vehicle's route. Additionally, this profile generates an external server, which is accessible to the user "afterwards", and the driver is then responsible for changing his habits without any type of interaction with the system; he is a passive receiver of this information, which is not provided in real time. Therefore, and in accordance with this document, it is advisable that the following technical problems be resolved: (i) total independence of the vehicle where to install the device; and (ii) a greater interaction with the user, emitting instant recommendations regarding driving in a safe manner.

DESCRIPTION OF THE INVENTION

The invention attempts to fulfil the requirement for an interactive system for efficient driving that is based on economical as well as ecological aspects. To accomplish this, the device objective of this invention, implements means for monitoring the driving, means for processing this information and means for displaying the results such as HMI (Human Machine Interface); in other words, interfaces configured so the user can interact with the device.

There are behind the wheel behaviours that are known to be more economical and ecological than others. For example, changing gears at proper speeds can save gas; another example is starting the engine without pressing down on the gas pedal. However, and as a general rule, drivers do not remember these types of recommendations when driving and, additionally, they accumulate driving habits that are not very efficient. For this reason, the device described in this invention receives data relative to the way the user is driving the vehicle, which are then compared with the data that is defined as optimum in the device itself and instantaneously shows these results to the user. In a parallel way and as an option, the device offers recommendations to the driver for reducing consumption, prior to or during the driving. With the help of a global positioning system it is possible to know the vehicles speed and the device offers the results to the user. In a parallel way and as an option, the device offers recommendations to the driver for reducing consumption, prior to or during the driving. With the help of global positioning system data, the vehicles speed is also known and the device offers recommendations regarding when to change gears in a way that will result in optimizing fuel consumption.

The device is also capable of considering the different types of vehicles through the incorporation of data and/or technical specifications of vehicles that enable to optimize driving in terms of consumption and efficiency, offering driving advice in accordance with the type of vehicle that is being used.

For this reason, the device processes data such as road inclination or the weather conditions among others, and offers recommendations after these variables have been taken into account. It can also receive data from digital maps and with the help of the positioning system, it offers suggestions for driving more efficiently, since thanks to the maps, it is possible to know the average inclination of a determined route and thus offer specific driving suggestions to the user for this specific route.

Some of these recommendations may have to do with the use of accessories like air conditioning for instance, which may determine a more efficient usage in terms of fuel consumption with the help of for example, a thermometer.

At the same time, the invention may encompass different means for displaying the information to the driver; one of these may offer for example, the quantity of $CO_2$ and/or the total monetary cost that the vehicle is producing, as compared with a standard in accordance with the variables associated with the drive, the surroundings, the amount of traffic and the vehicle itself. Also, with the help of digital maps and the vehicle specifications, the system can offer specific consumption predictions in terms of $CO_2$ as well as in terms of the time and the cost of taking the proposed route, taking into consideration the different alternatives, offering the most optimum one according to the particular situation.

The device also enables to send diagnostic data regarding the driving, more or less, economical or ecological that includes the different incidents that may have occurred to a data processing system that is outside the vehicle, and it may do this in real time as well as after the drive.

Similarly and as an option, the device has access to the engine RPMs the vehicle is experiencing at that moment, combining the acoustic information provided by the engine for a determined number of turns, with the ideal number of revolutions the device has stored.

This invention is not only useful as a means for driving more efficiently, but is also valid for teaching how to drive in a more economical fashion, so the user can correct driving habits in real time thus saving on fuel.

A purpose of this invention is to combine the signalling of a route using highways and urban road maps, the traffic rules at those locations and the aforementioned vehicle driving data, in such a way that not only the economical repercussions of driving are evaluated but also the legal repercussions and the personal safety hazards of such driving. The processing means combines all the provided information in order to offer the driver relevant information regarding his safety. Through several types of relative recommendations like for example, the time of day the driving is taking place and the location from where the vehicle begins to move may offer recommendations regarding the most common risks associated to these times and uses. Also, and as and option, it is possible to record the risky events in a storage device and send these when deemed appropriate. This is useful when for example, a user repeatedly drives in a risky manner, the device can make this situation known to whom it deems appropriate and if necessary, may proceed to immobilizing the vehicle and/or reduce its power.

In the same way, the device is capable of warning against possible hazardous sections of the route and the reasons for these hazardous sections; thus offering information regarding the possible risks associated to a specific area. The device can offer information relative to stopping areas for example, a safety belt, and the reasons for it.

In other words, in general, the device offers safety recommendations that may be generic as well as specific depending on the operation of the vehicle and/or the biorhythms of the driver; in other words, taking into account the time of day the driving is taking place as well as the current weather conditions.

The described device enables to provide the user with the safety distance with respect to other vehicles in metres or in equivalent units because the device calculates the safety distance required by the vehicle in accordance with the type of vehicle and the load, displaying it for the user; for example, on a car navigator screen, simulating if required, the distance in a three-dimensional display or over the image captured by a camera in real time of the drivers view, because when the route information and maps are known, the safety distance can be simulated over a 3D map.

In general, the device as an option is capable of reminding the user of routines that are important regarding safety and driving, which otherwise, are difficult to memorize by the user. An example of these recommendations is "turn on the lights no that you can be clearly seen", coinciding with the sunset and sunrise or when it is raining. In general, these are recommendations designed for improving the comfort and safety of the driver, in relation even with the biorhythms. In this last case, the device sets adequate times for driving and plans resting periods in accordance with the biorhythms, traffic or weather conditions; when the weather forecast is known, the device proposes actions such as for example, not to drive through a route due to icing, low temperatures or difficulties of any other type, even recommending alternate modes of transportation if the conditions are severe enough for driving.

Based on this idea, the device suggests safe places to stop for the occupants of the vehicle, which proves to be especially useful in places that are unknown to the drive. Therefore, the device, in a secondary way, warns the driver of possible risks, providing specific help as well as generic help regarding the management, training and knowledge of the driving risks associated with a vehicle. Likewise, it is useful as an interactive reminder of the legal driving rules, so it may offer added information, not only of all the signs that may be present on the road but also of the rules that may even be incorporated onto the navigator map itself.

Another secondary and optional aspect of this invention solves the requirement to combine cost behaviour data of the vehicle itself (such as the cost of fuel) as well as the economic costs generated by the vehicle user, displaying the data of a specific route regarding actual cost as well as predicted cost, to provide the user with the capability of deciding in a efficient manner if the trip in the vehicle is an adequate option or if it is necessary to opt for a more economical mode of transportation in real terms.

For this, the vehicle additionally includes at least the following: (i) a means for storing the data relative to the locations of expenditures related with the GPS maps as well as the data relative to the vehicle and its consumption; (ii) a means for storing the data relative to fixed costs; and (iii) a third means for recognizing a cost that also includes at least one of the following elements:

(a) a form that appears in the means for interaction with the user, configured for entering the cost data, and appears in these means of interaction with the user in an automatic way when the global positioning system detects a cost location that was previously stored in the data storage device;

(b) a means for scanning the expenditure receipt and its optical identification; and (c) a combination of the above;

Where said means are configured so the costs remain stored in a second database that is accessible to the user for viewing and control as well as for the generation of different types of balances; and where additionally, the means for processing are configured for calculating the approximate cost of a determined trip, which combines the data relative to the global consumption of the vehicle stored in the means provided for this effect, the distance travelled and the price of the fuel.

Therefore, thanks to this, it is possible for the device to provide an estimate of the possible costs, analysis of these costs and methods for entering this data in an efficient manner, where one of the advantages that such a cost management system may have consists in being able to periodically control the costs incurred and associate them to specific activities.

As an option, the device shows the user the anticipation distance, which as opposed to the safety distance, shows the distance the vehicle must maintain with respect to other vehicles in order to take as much advantage as possible of the vehicle's inertia. To accomplish this, and as a minimum, we must know the type of vehicle and its behaviour regarding deceleration (obtained from the optimum behaviour of the car) and the space required for this, the vehicles speed (obtained for example, from GPS) and display this information for the driver after it has been calculated.

The device for displaying this anticipation distance in a more precise way incorporates many detectors of the relative position of both vehicles and offers the user a target position in order to take advantage of the inertia. Additionally, it may share this information with an automatic transmission, changing gears in accordance with the distance and the behaviour of the vehicle that is located in front.

We must not confuse the anticipation distance with the safety distance. The latter is based on the distance required by a vehicle for stopping by using all of its available means like for example the brakes and the road conditions, while the anticipation distance is a different distance that takes into account the deceleration of the vehicle only or at least fundamentally with the engine brake since during this process the fuel consumption is zero, and to reach this distance the vehicle's speed is used, the braking action using the engine brake or by lifting the foot off the gas pedal, the gear it is in, if it has an automatic transmission, and the weight of the vehicle for defining an inertia.

In a parallel way and as an option, it is possible to include the road data via the maps, inclination, etc., giving the magnitude a direct relation with the speed at all times, and unique to each vehicle and situation. Additionally, we must take into account that the car is moving, which makes it necessary to take this fact into account when performing the calculation, understanding that the preceding vehicle is travelling at a similar speed as our own vehicle.

Regarding excessive acceleration, this is calculated using the average vehicle time and taking into account the radius of each of the gears as well as the most efficient speed. Subsequently, it is checked that the instant speed is within the efficient acceleration threshold. When the device detects in a time "t" that the vehicle has abruptly accelerated, this information is provided to the driver by means of a graphic and/or aural warning.

Thanks to the device described herein, a monitoring of the driving device is achieved that is completely interactive with the vehicle user in real time and independent, since it is never required to be connected with the centre that governs automotive vehicles.

BRIEF DESCRIPTION OF THE FIGURES

Following is a brief description of a series of drawings that help to better understand this invention and are precisely related to the embodiment of this invention, providing an illustrated example that is not intended to limit this invention.

PREFERRED EMBODIMENT OF THE INVENTION

The device for monitoring the process of driving a vehicle essentially consists of at least:

a first means of processing a signal; a second means of detecting the vehicle movement; a means for providing an HMI type of interactive display of information for the user; and a means configured for knowing the consumption characteristics of the vehicle and its technical characteristics as far as optimum theoretical behaviour; where the means for processing are configured for calculating the optimum consumption according to the characteristics of the vehicle, establishing the driving parameters required for equating the actual consumption to the optimum consumption, displaying this information to the user in the means available for display.

Therefore, and in a preferred embodiment of this invention, before using the device requires a previous configuration from the user; in such a way so he can chose between different options to be able to use the vehicle in an efficient manner, which has been selected between more than 50 makes and 6000 models, stored and integrated in the means for accessing vehicle characteristics. In any case, if the vehicle is not predefined in these means, it is also possible to enter it using the "defined by the user" option, which may be used for configuring the parameters that are suitable to the characteristics of your vehicle in a customized manner by selecting between the following parameters:

Type of transmission: sequential, manual or automatic.
Engine: from 1000 cc to more than 4000 cc.
Number of gears: from four up to eight gears.
Type of fuels. Gasoline or diesel.
Type of vehicle: utility, minivan, off-road.

Figure 1:
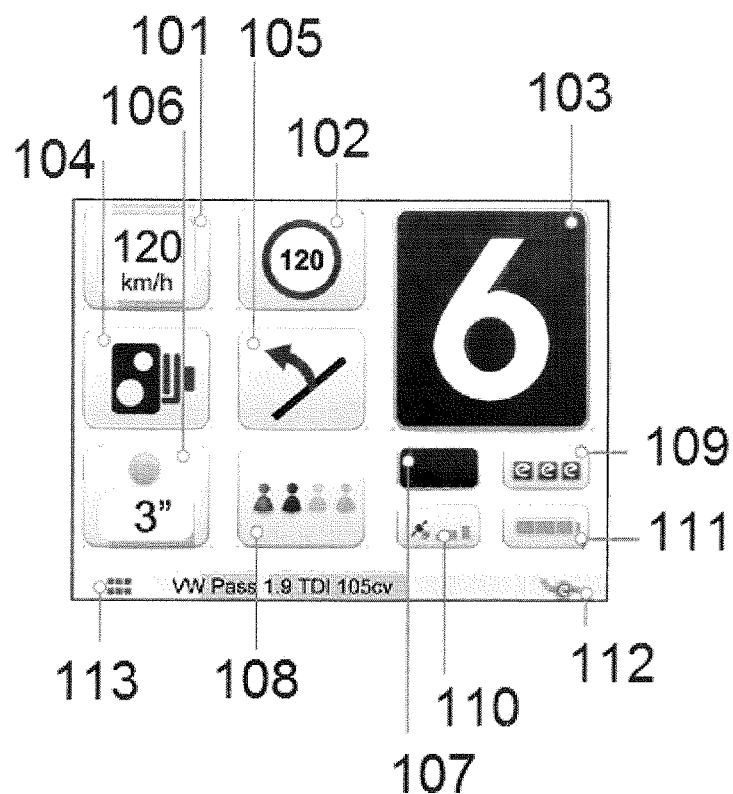
FIG. 1 shows a view of the ECONAV type device in operation.

Once the vehicle to be used has been chosen, the device is ready to be used in the mode we will define as ECONAV, where the device is working without showing the route listed in the global positioning system (GPS), as shown in FIG. 1. We will differentiate this mode of operation from the ECOMAP mode (FIG. 4), which shows the route with the basic data of information regarding economical driving, or of the navigation mode (FIG. 2) where a route is defined and it navigates towards it showing the basic information data regarding economical driving.

The ECONAV mode is defined by the user inside a menu (FIG. 3), where we can access the following:

(a) a first access (301) to the navigation mode, where, by pressing this option, we can use the device in navigation mode and plan the route;

(b) a second access (302) for selecting the level of consumption we wish to achieve for ecological driving; this way, we can select between the basic savings mode, average savings mode and maximum savings mode;

(c) a third access (303) of occupancy, where the vehicle load is defined between two levels of occupancy, maximum and minimum;

(d) a fourth access (304) of selecting the vehicle, where we can define over which vehicle we wish to apply the device; this access corresponds with the indications mentioned above, specifically, when the vehicle is within the means of the device itself, it simply requires selecting the type of fuel and engine from a list.

(e) a fifth access (305) of audio selection, capable of enabling and disabling the audio level of the device; and (f) a sixth access (306) of selection of preferences, where, among other things, you can select the information to be displayed for the user during driving for improving the driving efficiency, while being able to select the periodicity of when these suggestions are displayed.

Figure 2:
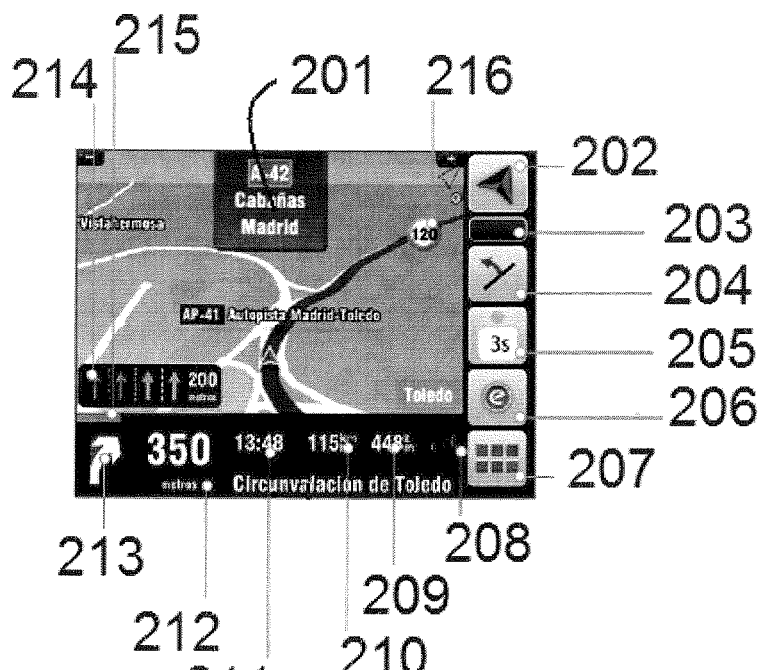
FIG. 2 shows a view of the device operating in navigation mode.

As has been previously explained, in the normal operation, the device includes three basic modes of operation; ECONAV mode (FIG. 1), ECOMAP mode (FIG. 4) and NAVIGATION mode (FIG. 2).

The ECONAV mode is used independently of the route, assuming that the user knows how to reach the destination and the objective is only to save fuel and reduce the $CO_2$ emissions, solely by selecting the vehicle as indicated above to obtain the appropriate indications for an efficient operation of the vehicle. Therefore, and in accordance with FIG. 1, the device shows the following information for the user:

(i) vehicle speed (101) in real time and maximum speed allowed on the road (102) that is being used, configured to indicate the level of risk associated with driving in another preferred embodiment of this invention;

(ii) recommended gear (103), where this indicator recommends the gear the user must be in real time depending on the vehicle's speed and the type of vehicle that has been selected. This is possibly the most important indicator, because thanks to it, the user is capable of adapting his driving to the optimum driving defined in the device for this specific vehicle. More specifically, for calculating the changing of gears, an XML type database file of the vehicles is used along with the technical specifications of the vehicles, which include the following data: Weights, number of cylinders, engine position, cubic centimetres, diameter stroke, valves per cylinder, type of engine fuel supply, HP/RPM, Torque (Nm/RPM, type of traction, gearbox, miles per gallon (urban, off road and mixed). $CO_2$ emissions, suspension and brakes. In other words, in this data we have the performance at 1000 rpm for each one of the gears, taking into account that the optimum gear change for a gasoline vehicle occurs at 2000 rpm and for a diesel at 1500 rpm, we perform the corresponding calculation to see the speed at which the gear changes must be carried out in that specific vehicle, which are based on the following generic function:

Speed=speed*(1+((5*(occupancy-1))/100+((5*(3-savings))/100));

(iv) radar warning (104) that is activated when driving on a road with a defined speed limit and we exceed it. Additionally, in this case we take into account the list of radars provided by authorities (in the case of navigating in Spain, the list is provided by the General Directorate for Traffic [DGT]);

(v) warning due to excess acceleration/deceleration (105) where this indicator appears when an excessive acceleration/deceleration is performed, taking into account that this excessive acceleration/deceleration is calculated based on the five last speeds and comparing them to the allowed acceleration/deceleration range for that vehicle, estimating if any excessive acceleration has occurred. These ranges are predefined in an accelerations table and another table for deceleration in the device itself. Only the excessive acceleration/deceleration is displayed if the previously estimated excessive acceleration and/or deceleration is detected tree times in a row.

(vi) anticipation distance (106) which is the indicator of the anticipation distance that must be maintained with the preceding vehicle; it may be selected between dry road surface and wet road surface (if it is not connected with any weather warning service) and the indication will be provided in seconds or metres. It is calculated by taking into account that the speed of the preceding vehicle is the same as the own vehicle and considers deceleration without stepping on the brake. This distance will be enough to stop in case the front vehicle stops abruptly and if not so, will take advantage of the vehicle's inertia, while also taking into account the variations in inertia when driving in sloped roads:

Distance=((radius_turn_gear*(speed/10))$^2$-(inertia_vehicle-engine resistance);

(vii) consumption efficiency indicators (107), which we will call "ecolights", where we can see the level of efficiency in fuel consumption in real time, which includes four levels that will change colours:
Green: optimum level of consumption;
Yellow: medium level of consumption;
Red: high level of consumption;
Grey: lower than optimum level of consumption.
These levels are defined by the relation between the road speed limit and the vehicle's speed, in the case it exists, (spd=speed, speed in km/h):

| Road limit | Grey | Green | Yellow | Red |
| --- | --- | --- | --- | --- |
| Without limit | Spd <105 | — | Spd <125 | Spd >125 |
| Spd <90 | Spd <70% limit | Spd <95% limit | Spd <110% limit | Spd >110% limit |
| Spd <120 | Spd <65% limit | Spd <95% limit | Spd <110% limit | Spd >110% limit |
| Spd >120 | Spd <60% limit | Spd <82% limit | Spd <115% limit | Spd >115% limit |

(viii) the occupancy level (108), consumption level (109). GPS signal (110), battery level (111). ECONAV menu (113) (shown in FIG. 3) and change to ECOMAP mode of operation are other possible accesses in this mode of operation.

Figure 3:
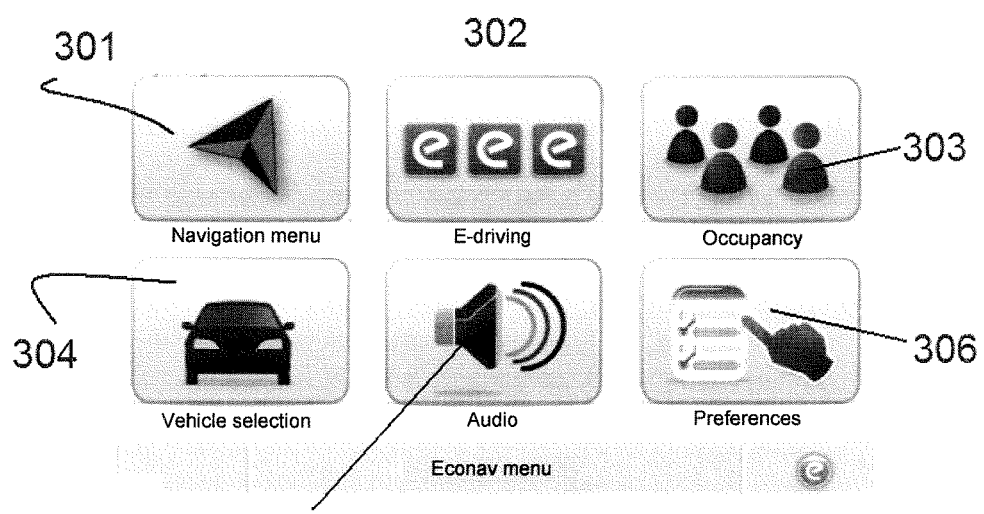
FIG. 3 shows a view of the device in the configuration of the different modes of operation.
Figure 4:
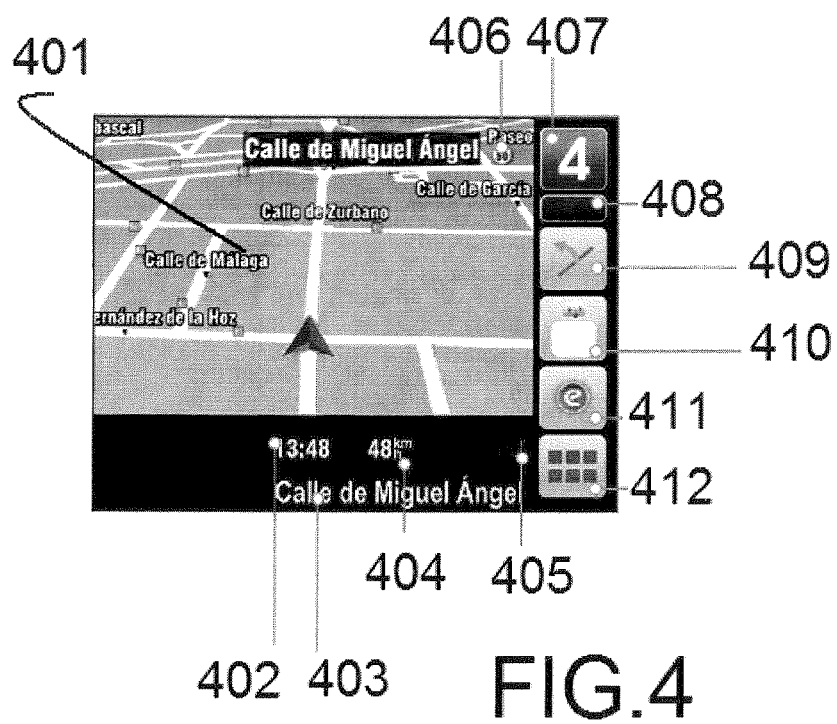
FIG. 4 shows a view of the device operating in ECOMAP mode.

The ECOMAP mode of operation is shown in FIG. 4 and shows a current view of the global positioning system map (401), the current time (402), the road indicator (name) (403), the current speed (404), the GPS signal (405), the maximum speed limit of the road (406), the recommended gear (407), the "ecolights" or lights that indicate the consumption efficiency (408), the excessive acceleration/deceleration warning (409), the anticipation distance (410), the switching (411) to ECONAV mode shown in FIG. 1 or the access to the menu (412) represented in FIG. 3. Thanks to this mode of operation, it is possible to view the vehicle's location on the map, while the indicated data summary appears on the side of the screen, which are the recommendations provided by the device for obtaining an optimum use of fuel, which essentially correspond with the mentioned calculations for the ECONAV operation of FIG. 1. In this mode of operation, and for safety reasons, it is not possible to enter a route in the GPS.

The navigation mode of operation is shown in FIG. 2, which shows all the typical functionalities of a GPS navigator and where a summary of the recommendations for reducing the fuel consumption are displayed except the changing of gears, not shown for safety reasons (to prevent producing unnecessary distractions for the driver). Therefore, the navigation mode of operation displays a view of the map (201) with a mode of operation indicator (202), the ecolights or efficiency indicators (203), the acceleration/deceleration warning (204), the anticipation distance (205), access to the ECONAV menu (206), switching to ECONAV view (207) shown in FIG. 1, the GPS signal (208), the distance to destination (209), the vehicle's current speed (210), the current time (211), the distance to the destination (212), the direction to follow (213), the lane indicator (214) indicator that shows what lane you should be driving in, the percentage of the route (215) and the maximum speed limit of the road (216). All the calculations correspond with those already mentioned.

We must mention here that in the navigation itself, you can define points of interest (radars, hazardous sections, or any other item) where the direction plays an important role. The problem generally consists in knowing the direction the vehicle is driving in without entering a specific route in the device. To accomplish this, information regarding a point of interest is displayed; not when it is detected but when a direct relation is detected between the distance of the signal to be displayed and the vehicle's speed; in other words, if there is a radar signal at 1000 metres and the speed of the object is 10 metres per second, a new check is performed and we observe that 10 seconds later; that is, 100 metres later, we find ourselves at a range of 900 metres from the signal, and therefore we can conclude that the vehicle is nearing the object and therefore, it is located on its path; if by the contrary, the distance increases, we assume it is getting farther away.

In a second embodiment, this device includes a database with the current legal driving regulation so that the processing means can calculate, according to the information provided by the vehicle and in accordance with the type of driving, a level of risk, a recommendation to prevent such risk and a warning of the legal consequences associated to that risk. Additionally, it includes a communications emitter-receiver element that is configured for:
- (a) sending the generated risky situations to another nearby device and/or an external server;
- (b) receive data from other devices and/or an external server in accordance with the location of the device, where said data includes the weather data and the forecast as well as the data relative to traffic;
- where the processing means takes this data into account for generating recommendations regarding the risks associated with driving.

In a third embodiment, the processing means are configured for calculating the estimated safety distance with respect to other devices, displaying this safety distance on the display screen.

In a fourth embodiment, the processing means are configured for calculating the economic expenditure associated to the defined route; at the beginning, as estimated expenditure, and at the end of the route, as accumulated expenditure of the journey in accordance with the route and the theoretical optimum consumption of this route for a specific vehicle and, instantaneously, as accumulated in real time. Additionally, it includes means for recognizing an external expenditure that is not due to the direct consumption by the vehicle, in such a way that the device has the data relative to fixed costs stored along with one of the following elements:
- (a) a form that appears in the means for interaction with the user, configured for entering the cost data, and appears in these means of interaction with the user in an automatic way when the global positioning system detects a cost location that was previously stored in the data storage device;
- (b) a means for scanning the expenditure receipt and its optical identification; and
- (c) a combination of the above.

In a fifth embodiment, it is possible to incorporate a plurality of detectors for detecting the relative location of both vehicles and offer the user an objective location in order to take advantage of inertia, and this information is able to be shared with the automatic transmission and therefore, change gears according to the distance and behaviour of the vehicle that is located nearby.

Finally, in a sixth preferred embodiment, the device is able to display external information like for example, electronic mails or SMS messages in a secure manner; in other words, for example, when the vehicle has stopped, storing these incoming messages in a buffer when it is not possible to display them, displaying them afterwards when safe conditions are met.

In all the modes of operation and performances, the information is provided by means of a code of colours and/or large numbers in a way that the user without directly looking, can clearly interpret the recommendations provided by the device, in a way that guarantees the least number of distractions for the driver as possible.

The device described in this preferred and non-exclusive embodiment is implemented in a Hardware with an internal 2 GB-64 MB SDRAM flash type memory, it has an SD/MMC data input and capable of supporting SDHC, a standard GPS receiver, a "dual core" 400 Mhz integrated processor, a touch screen, an audio output, rechargeable battery and output/input data USB 2.0 type.

The invention claimed is:

1. A device for monitoring the process of driving a vehicle optimizing the fuel consumption in which an interactive and real time monitoring of the driving is achieved without a connection with a center that governs the vehicle; said device comprising:
   a) a vehicle movement detector;
   b) a database in which technical characteristics of the vehicle are listed, the technical characteristics including: weights, number of cylinders, engine position, cubic centimeters, diameter stroke, valves per cylinder, type of engine fuel supply, HP/RPM, Torque (Nm)/RPM, type of traction, gearbox, miles per gallon in urban, off road and mixed driving, $CO_2$ emissions, suspensions, and brakes;
   c) a display comprising an HMI interface comprising a menu that includes, at least:
      i) a selector of the level of consumption selected between basic saving mode, average saving mode or maximum saving mode; and
      ii) a selector of the level of occupancy between maximum or minimum level of occupancy; and
      iii) a selector of a vehicle from the database in which the device is used; and
   d) a global positioning system;
   wherein the device comprises a processor configured to:
      i) calculate an optimum consumption according to the technical characteristics of a vehicle selected from the database;
      ii) calculate a current gear of the vehicle in real time for equating the vehicle consumption to the optimum consumption as a function of a technical specification of a vehicle selected from the database wherein the speed in which the gear change must be carried out is calculated according with the following formula:

$$\text{Speed in which the gear change must be carried out} = \text{speed of the vehicle} * (1 + ((5*(\text{level of occupancy} - 1))/100 + ((5*(3 - \text{level of consumption or saving mode}))/100))$$

a) wherein the speed of the vehicle is provided by the global positioning system;
b) wherein the level of occupancy is selected by the user in the HMI interface; and
c) wherein the level of consumption or saving mode is selected by the user in the HMI interface;

iii) calculate an estimated safety distance with respect to other devices; and
iv) calculate an anticipation distance according with the following formula:

anticipation distance=(radius turn gear*(speed of the vehicle/10))$^2$−inertia−engine resistance;

wherein the inertia is the variations in inertia when driving in sloped roads and wherein the radius turn gear and the engine resistance represents the deceleration of the vehicle without stepping on the brake;

and wherein said gear, said safety distance and said anticipation distance are provided to the user by means of the display.

2. The device of claim 1, wherein the global positioning system is GPS type; said global positioning system further configured to lay out a route that are also configured to provide information of a route layout, the type of road, the position of the vehicle in the route and the orography of that route; and
wherein the processor is further configured to generate a consumption profile of said route.

3. The device of claim 2, wherein the GPS is configured to obtain and establish signaling data and road traffic organization in such a way that they can be displayed to the user in the display.

4. The device of claim 1 wherein the processor is further configured to calculate:
a level of risk according to the information provided by the vehicle and in accordance with the type of driving;
a recommendation to prevent that risk; and
a warning of the legal consequences associated to that risk; said warning being stored in a database with the current legal driving regulation.

5. The device of claim 4, which includes a communications emitter-receiver element that is configured for:
(a) sending generated risky situations to another nearby device and/or an external server;
(b) receive data from other devices and/or an external server in accordance with the location of the device, wherein said data includes the weather data and the forecast as well as the data relative to traffic; and
wherein the processor is further configured to generate a recommendation regarding the risk associated with driving according with the received data.

6. The device of claim 1 wherein the processor is further configured to calculate the economic expenditure associated with a route; said economic expenditure comprising an estimated expenditure at the beginning of the route and an accumulated expenditure of the route at the end of that route; and wherein the expenditure is calculated in accordance with the route, the theoretical optimum consumption for that route for a vehicle; and instantaneously as accumulated in real time.

7. The device of claim 1, further including:
(a) a form that automatically appears in the display when the global positioning system detects a cost location that was previously stored in a data storage device;
(b) a scanner; and
(c) a combination of the above.

8. The device of claim 1 wherein the processor is further configured to
calculate an excessive acceleration or deceleration of a vehicle; and
display the excessive acceleration.

9. The device of claim 1 wherein the processor is further configured to:
calculate the average time in which a vehicle is in acceleration or deceleration taking into account the radius of each one of the vehicle's gears and an efficient speed;
check the speed at different moments of a route to calculate an efficient acceleration threshold and a range that is outside this efficiency;
establish if the vehicle has accelerated or decelerated abruptly; and
provide a graphic and/or aural warning when the vehicle has accelerated or decelerated abruptly.

10. The device of claim 1 wherein said device is connected with a plurality of detectors for detecting the relative location of two vehicles and provides the user with an objective location in order to take advantage of inertia; and wherein said data is able to be shared with a vehicle automatic transmission in order to change the vehicle gear according to the distance and behavior of the vehicle that is located nearby.

11. The device of claim 1, wherein the vehicle movement detector comprises an accelerometer.

12. The device of claim 1 wherein the processor is further configured to determine a non-driving position; and
if it is established a non-driving position, the device is configured to display external information of the type that requires the attention and/or reading on the part of the user; and
if it is not established a non-driving position, the device is configured to store incoming messages in a buffer.

13. The device of claim 1 wherein the information is provided by means of a code of colours and/or large numbers in a way that the user without directly looking, can clearly interpret the recommendations provided by the device.

* * * * *